United States Patent
Chen

(10) Patent No.: US 11,404,760 B2
(45) Date of Patent: Aug. 2, 2022

(54) ELECTRICAL POWER DISTRIBUTION SPLITTER

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 17/242,423

(22) Filed: Apr. 28, 2021

(65) Prior Publication Data
US 2021/0384605 A1 Dec. 9, 2021

Related U.S. Application Data

(60) Provisional application No. 63/034,780, filed on Jun. 4, 2020.

(51) Int. Cl.
| | |
|---|---|
| *H01P 5/12* | (2006.01) |
| *H02J 4/00* | (2006.01) |
| *H01R 13/627* | (2006.01) |
| *H04L 12/10* | (2006.01) |

(52) U.S. Cl.
CPC ........... *H01P 5/12* (2013.01); *H01R 13/6273* (2013.01); *H02J 4/00* (2013.01); *H04L 12/10* (2013.01)

(58) Field of Classification Search
CPC ... H01P 5/12; H02J 4/00; H04L 12/10; H01R 13/6273
USPC ............... 307/11; 439/353; 362/249.01, 458
See application file for complete search history.

(56) References Cited

PUBLICATIONS

Chargetech (award date 2019, Screen Capture from internet<https://chargetech.com/product/power-strip-charging-station-cs8/) (Year: 2019).*
EU standards Dec. 30, 2010, Electronics Design, Mobile40 (Year: 2010).*

* cited by examiner

*Primary Examiner* — Arnold M Kinkead
(74) *Attorney, Agent, or Firm* — Stuart M Goldstein

(57) ABSTRACT

An electrical power distribution splitter is designed to receive high wattage electrical power, e.g. 80 W-600 W, and then to "split" that power into multiple low output wattage electrical power, e.g. 60 W/12V or 96 W/24V. An IC and circle board in the distribution splitter is used to reduce output power in this manner. The result is the ability to input a single large wattage electrical power supply to a distribution splitter which then outputs multiple lower wattages to a variety of individual different circuits, and, in so doing, a Class 2 UL power supply can be utilized. This is especially important in the signage industry where, for example, one large wattage power electrical supply feeding into the power distribution splitter can supply multiple smaller wattage power to different circuits in one sign.

7 Claims, 6 Drawing Sheets

ELECTRICAL POWER DISTRIBUTION SPLITTER

RELATED APPLICATION

This application claims the benefit of provisional application Ser. No. 63/034,780, filed on Jun. 4, 2020.

FIELD OF THE INVENTION

The present invention relates to the distribution of electrical power from a power source emitting high input wattage electrical power to multiple low output wattage electrical power, with particular application to electric signage.

BACKGROUND OF THE INVENTION

United States safety standards and regulations require that only Class 2 UL standard electrical power be used in the electrical signage industry. The output electrical power supply must be less than 60 watts for 12V or 96 watts for 24V for single electrical leads; that is there can be only one positive wire out and one negative wire out. If the power supply has multiple leads, each lead cannot be greater than 60 W/12V or 96 W/24V.

Thus, if 120 W of power are required for electrical signage under Class 2, there must be two leads from the power supply. A single lead for 120 W of power will be designated class 1, which is not permitted in the signage industry. Therefore, in order to ensure Class 2 compliance with US safety standards and regulations, current lighted signage techniques require excessive system components which are labor intensive to install. This generally results in a tremendous waste of time, material, and money.

For example, and with reference to FIG. 1, current signage systems 50 have signage cabinets 52 which house light sticks 34. LED modules 36 mounted on the light sticks are currently now provided power by a multitude of individual power supply units P1, P2, P3, and P4 located in signage cabinet 52. Each power supply unit provides 40-60 W for 12 or 24V as per US regulations. Multiple electrical wire circuits 54 from each of these power supply units to the sticks must be individually connected by screw on wire nuts, or like manually operated connectors 55. Some signage systems, e.g. 60, as seen in FIG. 2, have individual power supply units P1-P4 located in base 61 of the sign. Electrical wiring 62 for each individual power unit run up vertical pole 64 for individual light sticks 34, again with their wiring manually secured by screw on wire nut connectors 55. These are the very signage system lighting techniques which are responsible for increased labor and material costs, both during installation and repair, which the present invention is designed to address and rectify.

SUMMARY OF THE INVENTION

It is thus the object of the present invention to provide an electrical power distribution splitter which is designed to receive high wattage electrical power, e.g. 80 W-600 W, and then to "split" that power into multiple low output wattage electrical power, e.g. 60 W/12V or 96 W/24V. An IC electric board in the power distribution splitter is used to reduce output power in this manner. The result is the ability to input a single large wattage electrical power supply to a single power distribution splitter which then outputs multiple lower wattages to a variety of individual different circuits, and, in so doing, Class 2 UL standard power can be utilized. This is especially important in the signage industry where, for example, one large wattage power electrical supply feeding into the power distribution splitter can supply multiple smaller wattage power to different circuits in one sign.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DESCRIPTION DRAWINGS

DETAILED DESCRIPTION OF THE INVENTION

Figure 4:
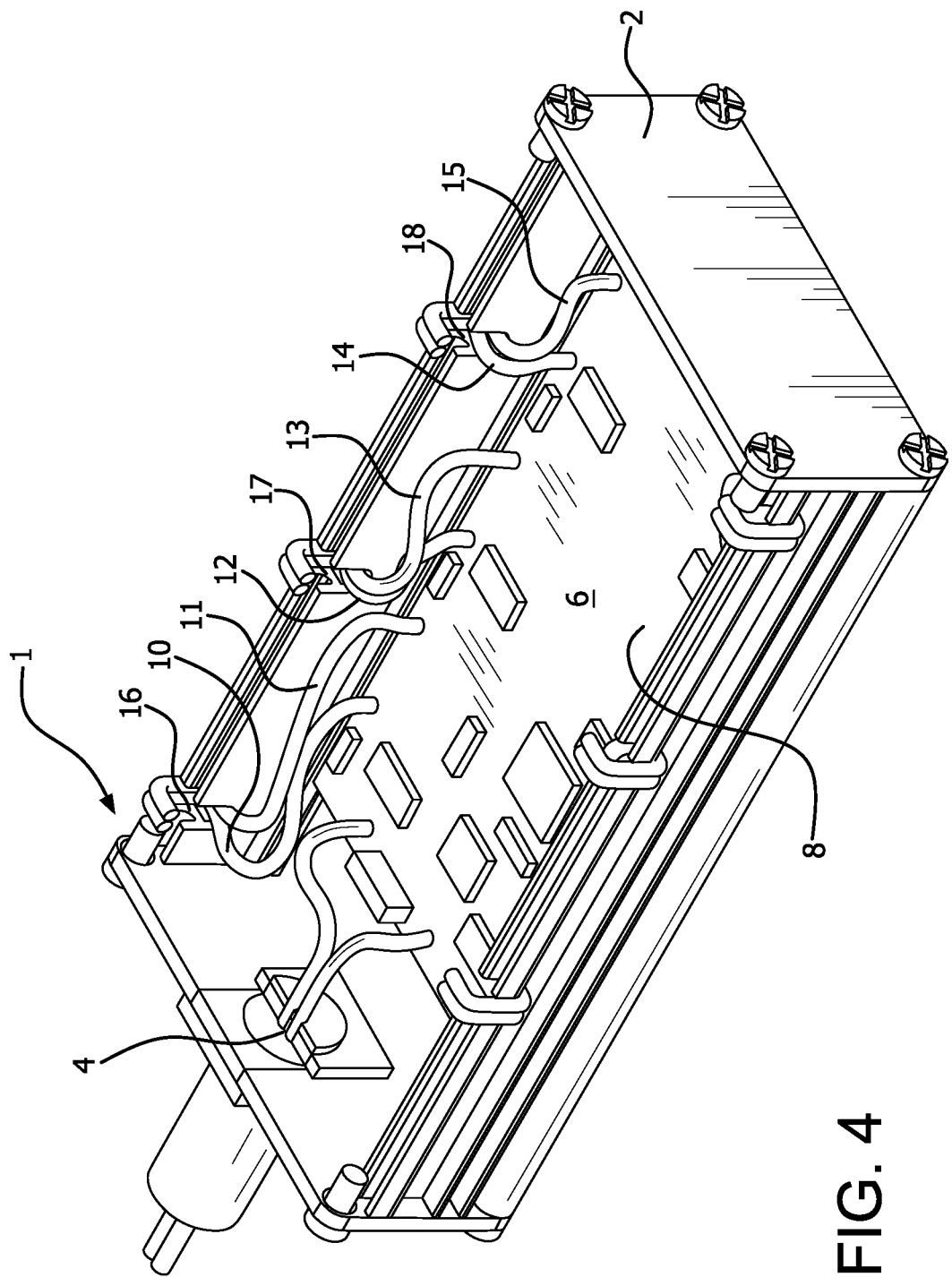
FIG. 4 shows the internal components of the power distribution splitter of the present invention.

Power distribution splitter (PDS) 1 of the present invention comprises main body 2 having input port 4 for receiving high wattage electrical power from electrical power source P. As best seen in FIG. 4 showing the internal components of PDS 1, interior space 6 of main body 2 comprises electrical power reduction means in the form of IC electric board 8 for receiving the high wattage electrical power from power source, e.g. power supply unit P, and then outputting lower wattage electrical power. This lower wattage electrical power is transmitted from electric board 8, through a plurality of electrical wire conduits 10, 11, 12, 13, 14, and 15 to electrical contacts 16, 17, and 18 at the edge of main body 2. It is understood that main body 2 also has six wire conduits and three electrical contacts at the opposite edge of the main body which are identical to those components illustrated, but not specifically shown in FIG. 4. Electrical wire elements 19, 20, 21, 22, 23, and 24 are attached at one of their ends to the electrical contacts on main body 2 and at their other, terminus ends to quick electrical connectors 25, 26, 27, 28, 29, and 30. These connectors are, in turn, attached via wiring directly to light sticks 34 carrying LED modules 36 to supply the light sticks with the requisite lower wattage electrical power which complies with Class 2. In this manner, high wattage electrical power is transmitted directly to PDS 1 which then delivers lower wattage electrical power to connectors 25-30 for ultimate delivery of the lower wattage electrical power to illuminate LED modules 36.

Figure 5:
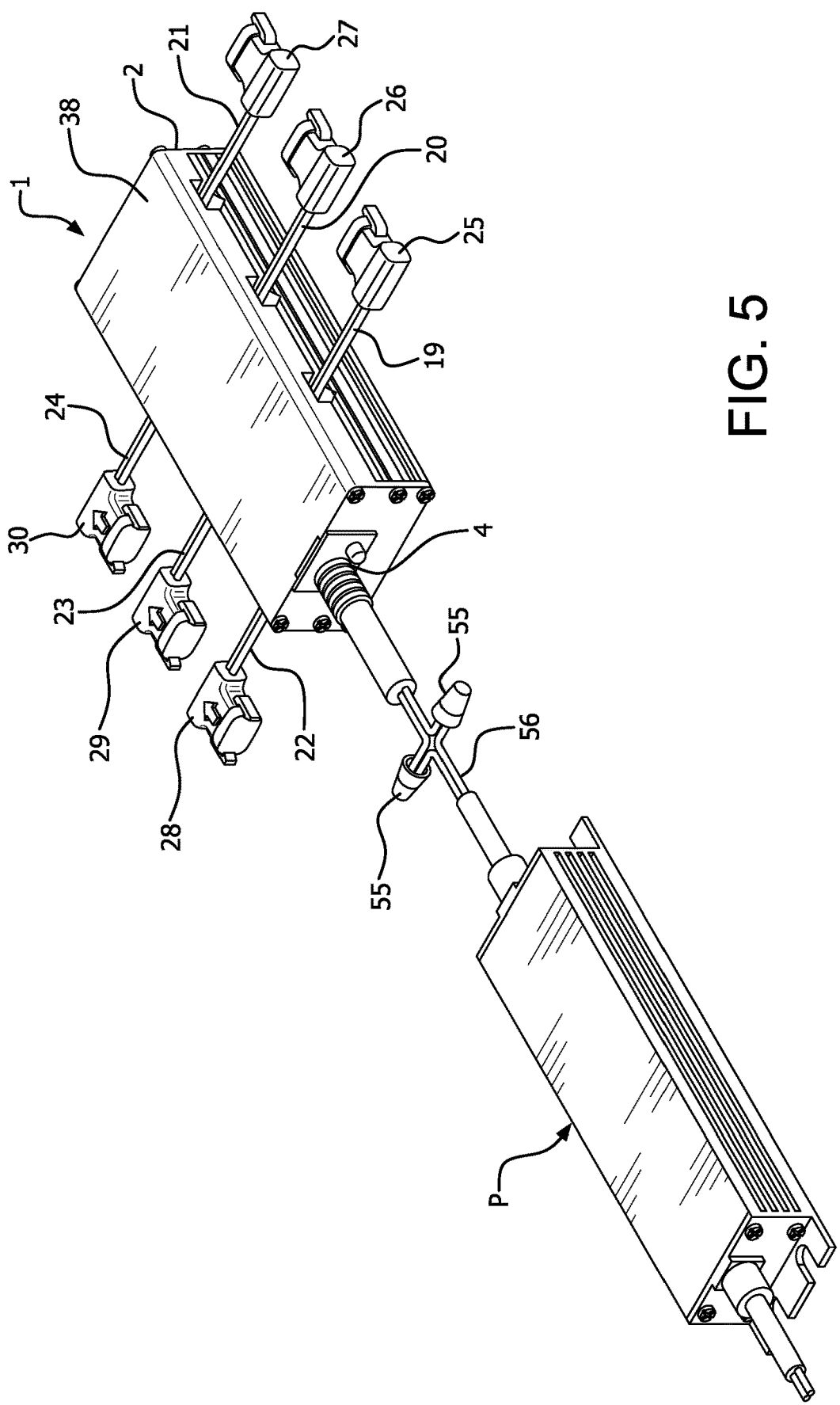
FIG. 5 shows the power distribution splitter of the present invention connected to a power source with its electrical connectors extended.

FIG. 5 shows PDS 1 in its use position with wire elements 19-24 extended out from main body 2 and with quick electrical connectors 25-30 available for connecting simplified electrical wire circuitry, comprising wiring 72, 73, 74, and 75, to light sticks 34. Power supply unit P provides electricity via electrical wiring 56 connected by wire nuts 55 to input port 4 of PDS 1.

Figure 6:
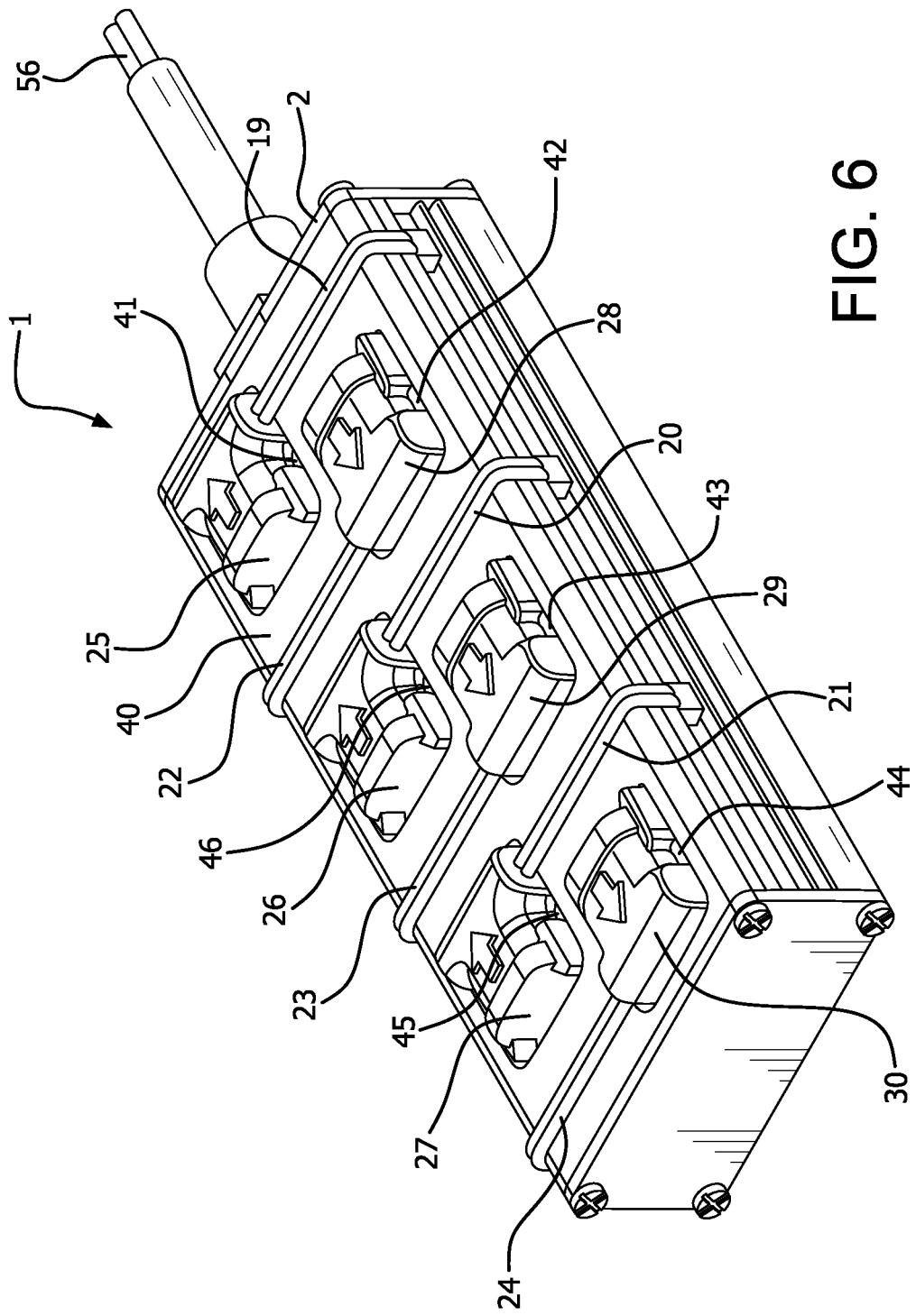
FIG. 6 shows the power distribution splitter of the present invention with its cover removed.

FIG. 6 shows PDS 1 with its top protective cover 38 removed. Inner connector storage plate 40 has topside, inset openings 41, 42, 43, 44, 45 and 46, for the placement of connectors 25-30 in a storage position. In this position, electrical wire elements 19-24 run from the connectors, across storage plate 40 to their respective edge contacts 16-18 and those three contacts on the opposite edge of main body 2.

Figure 1:
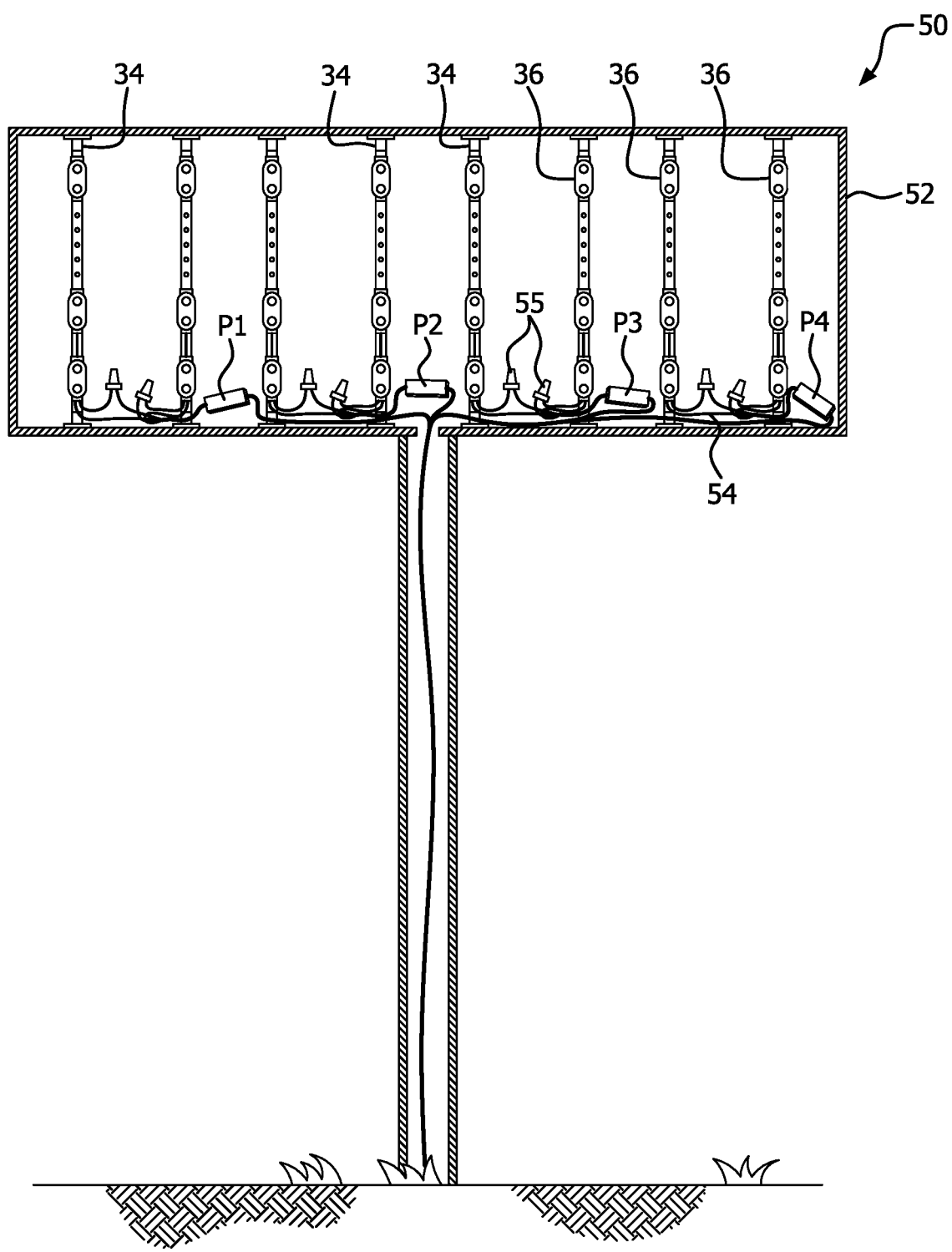
FIG. 1 illustrates a current means of providing electrical power to lighted signage.
Figure 2:
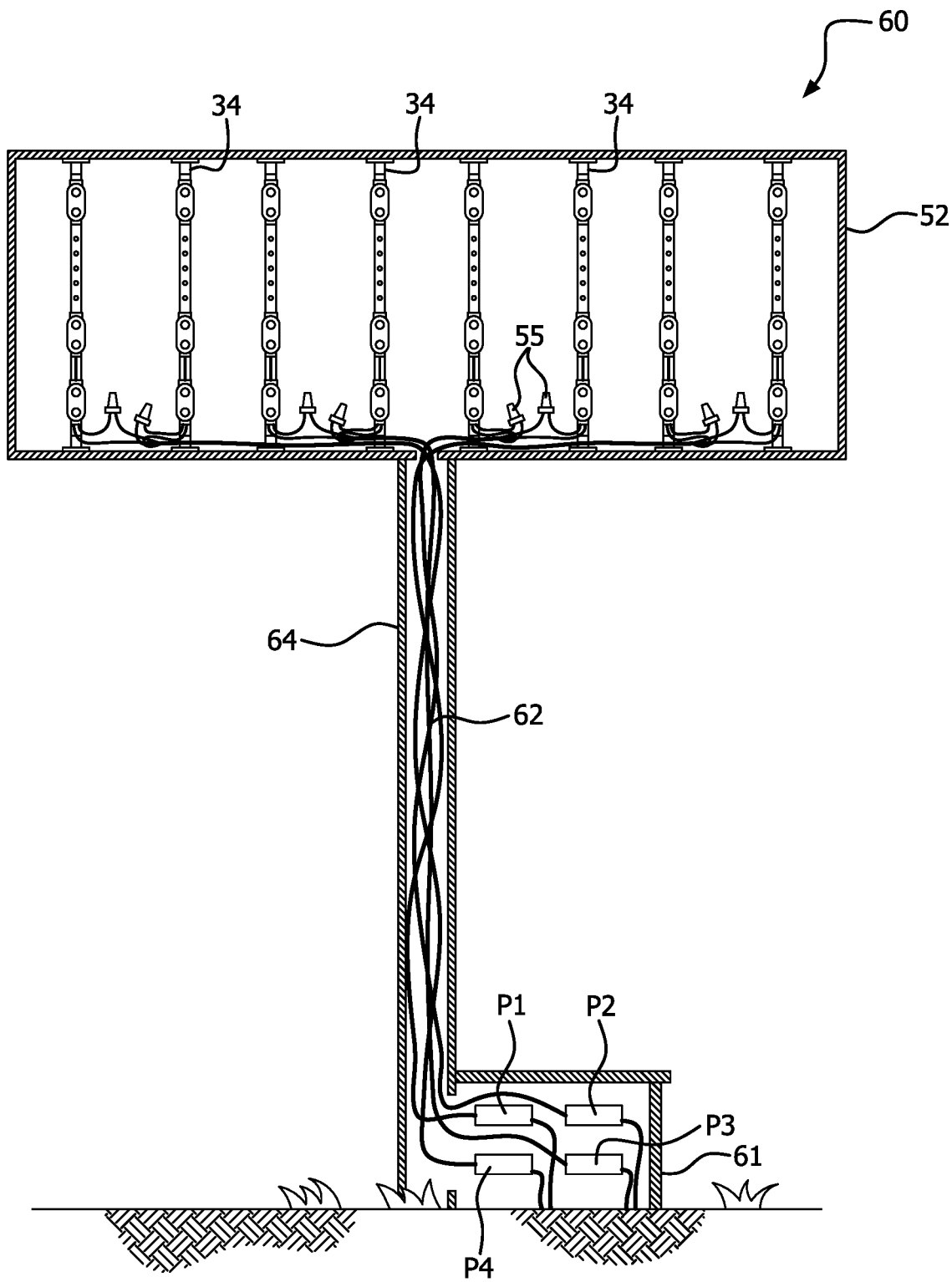
FIG. 2 illustrates another current means of providing electrical power to lighted signage.
Figure 3:
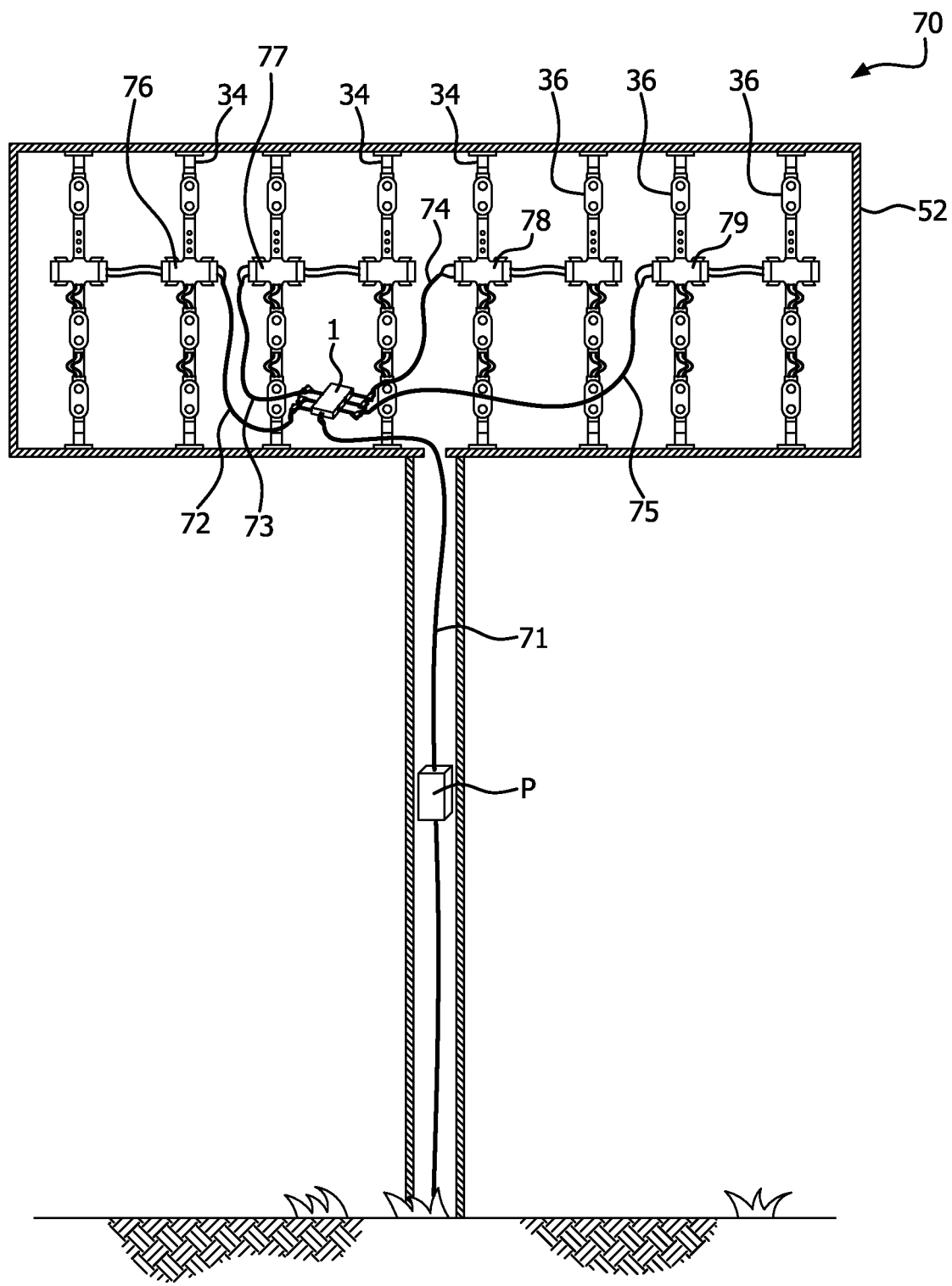
FIG. 3 illustrates the means of providing electrical power to lighted signage utilizing the power distribution splitter of the present invention.

FIG. 3 provides an example of how PDS 1 of the present invention is advantageously used for a lighted signage system 70 using the present invention, as opposed to the current configurations shown in FIGS. 1 and 2. Power supply unit P provides electrical power of, e.g. between 80 W and 600 W to PDS 1 via electric wire 71 which then reduces the wattage to 60 W/12V or 96 W/24V. Quick electrical connectors 25-30 of PDS 1 are removed from their respective inset openings 41-46 so that any or all of the connectors are available for connection to electrical wiring 72-75 and then to light sticks 34, via circuit electrical connectors 76, 77, 78 and 79. In this manner, the lower wattage electrical power from a single component, PDS 1, is transmitted to the various circuits containing light sticks 34 with LED modules 36, all within signage cabinet 52. Quick electrical connectors 25-30 and circuit electrical connectors 76-79, which are the subject of U.S. Pat. No. 10,938,170, allow for fast, simple and easy connections between PDS 1 and light sticks 34; thereby making the installation and necessary repairs of the signage efficient and economical, from a labor, time, and parts perspective.

Designed in accordance with Class 2 standards, PDS 1 has a current output of 5 A/12V and 4 A/24V, which corresponds to 60 W/96 W. There is no limitation of minimum power watts output and so this power consumption under Class 2 is acceptable. Maximum electrical current can be 30 A (360 W/12V and 600 W/24V).

Although six electrical output connections are disclosed herein, it is contemplated that any number of connections, e.g. 1, 2, 4, 8, 10, etc., can be included in a single PDS unit. Also, PDS units are not to be considered limited to the electrical power and current outputs previously discussed. For instance, the PDS is capable of adding additional voltage, e.g. 5V under Class 2. It can also be designed to distribute power under Class 1 standards.

While PDS 1 is shown with an electrical lighting signage system, its application should not be considered restricted to this singular use. The PDS can be used in other contexts where high wattage electrical power is being supplied and there is a requirement for the distribution of multiple lower wattage electrical power to different circuits.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An electrical power distribution splitter for delivering electrical power to multiple different electric circuits, said power distribution splitter comprising: a main body having an input port for receiving high wattage electrical power from an electrical power source and having electrical power reduction means for receiving the high wattage electrical power and for outputting lower wattage electrical power, wherein the high wattage electrical power received by the electrical power reduction means range is up to 360 W/12V and 600 W/24V;

a plurality of separate electrical wire elements connected to and emanating from the electrical power reduction means of the main body, the lower wattage electrical power being transmitted through the wire elements; and a plurality of electrical connectors, one of the plurality of connectors attached to the terminus of each of the plurality of wire elements; whereby with a single electrical power distribution splitter located within an enclosed space, in a splitter storage position each of the plurality of wire elements and connectors are located within the main body, and in a splitter use position the wire elements extend outwardly from the main body, into the space, with their respective connectors available for connection with the multiple different electric circuits to supply said circuits, and LED modules connected to the circuits, with the lower wattage electrical power.

2. The electrical power distribution splitter as in claim 1 wherein the electrical power reduction means comprises an IC electric board.

3. The electrical power distribution splitter as in claim 1 wherein the main body further comprises a plurality of openings into which the connectors are located when in said storage position.

4. The electrical power distribution splitter as in claim 1 wherein the main body comprises an inner, connector storage plate and a protective cover.

5. The electrical power distribution splitter as in claim 4 wherein the storage plate comprises a plurality of openings into which the connectors are located when in said storage position.

6. The electrical power distribution splitter as in claim 5 wherein the high wattage electrical power received by the electrical power reduction means range is up to 360 W/12V and 600 W/24V.

7. An electrical power distribution splitter for delivering electrical power to multiple different electric circuits, said power distribution splitter comprising: a main body having an input port for receiving high wattage electrical power from an electrical power source and having electrical power reduction means for receiving the high wattage electrical power and for outputting lower wattage electrical power, wherein the lower wattage electrical power range is up to 60 W/12V and 96 W/24V;

a plurality of separate electrical wire elements connected to and emanating from the electrical power reduction means of the main body, the lower wattage electrical power being transmitted through the wire elements; and a plurality of electrical connectors, one of the plurality of connectors attached to the terminus of each of the plurality of wire elements; whereby with a single electrical power distribution splitter located within an enclosed space, in a splitter storage position each of the plurality of wire elements and connectors are located within the main body, and in a splitter use position the wire elements extend outwardly from the main body, into the space, with their respective connectors available for connection with the multiple different electric circuits to supply said circuits, and LED modules connected to the circuits, with the lower wattage electrical power.

* * * * *